No. 842,194. PATENTED JAN. 29, 1907.
W. A. FREEMAN.
FERTILIZER DISTRIBUTER.
APPLICATION FILED JUNE 22, 1906.

2 SHEETS—SHEET 1.

Witnesses

Inventor
Wm A. Freeman
By W. J. FitzGerald & Co
Attorneys

No. 842,194. PATENTED JAN. 29, 1907.
W. A. FREEMAN.
FERTILIZER DISTRIBUTER.
APPLICATION FILED JUNE 22, 1906.
2 SHEETS—SHEET 2.
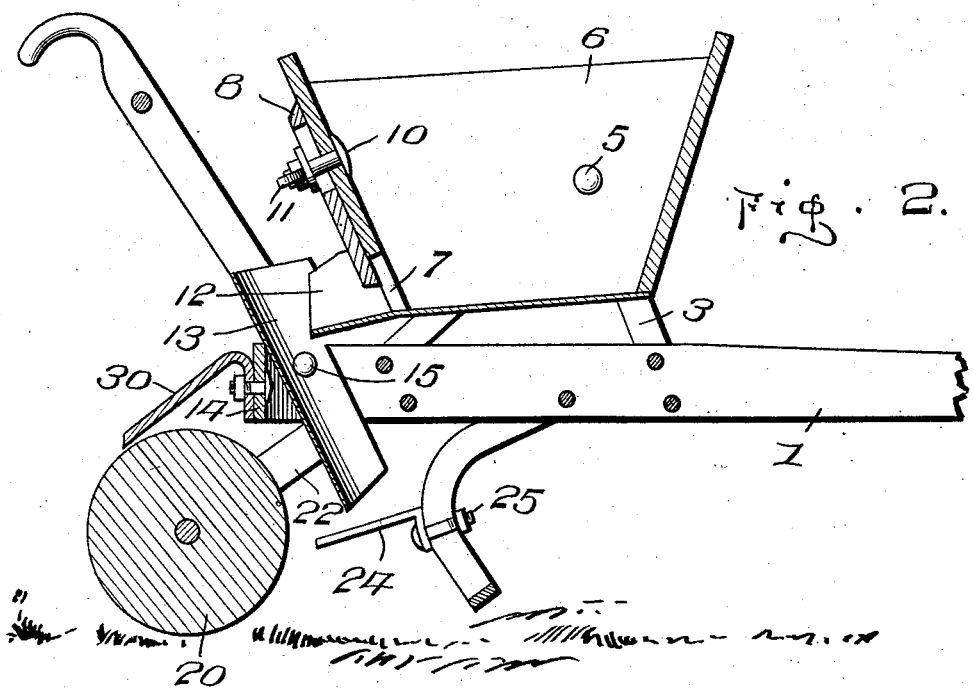
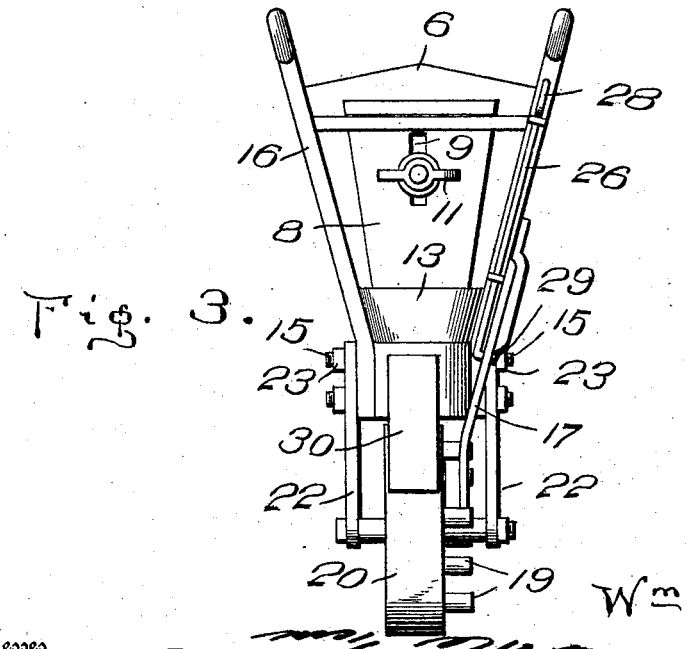
Inventor
Wm A. Freeman
Witnesses
By W. J. FitzGerald & Co.,
Attorneys
THE NORRIS PETERS CO., WASHINGTON, D. C.

UNITED STATES PATENT OFFICE.

WILLIAM A. FREEMAN, OF SYCAMORE, GEORGIA.

FERTILIZER-DISTRIBUTER.

No. 842,194.      Specification of Letters Patent.      Patented Jan. 29, 1907.

Application filed June 22, 1906. Serial No. 322,919.

*To all whom it may concern:*

Be it known that I, WILLIAM A. FREEMAN, a citizen of the United States, residing at Sycamore, in the county of Turner and State of Georgia, have invented certain new and useful Improvements in Fertilizer-Distributers; and I do hereby declare the following to be a full, clear, and exact description of the invention, such as will enable others skilled in the art to which it appertains to make and use the same.

My invention relates to new and useful improvements in fertilizer-distributers, and is adapted more particularly to be used in distributing that class of fertilizer known as "guano;" and my object is to provide means for depositing the fertilizer in a furrow.

A further object is to provide means for intermittently tilting the hopper, whereby the fertilizer will be deposited in a chute at regular intervals.

A still further object is to provide means for depositing the fertilizer at each side of the furrow when desired.
A still further object is to provide means for preventing the tilting of the fertilizer-receptacle.

Other objects and advantages will be hereinafter referred to and more particularly pointed out in the claims.

Figure 1:
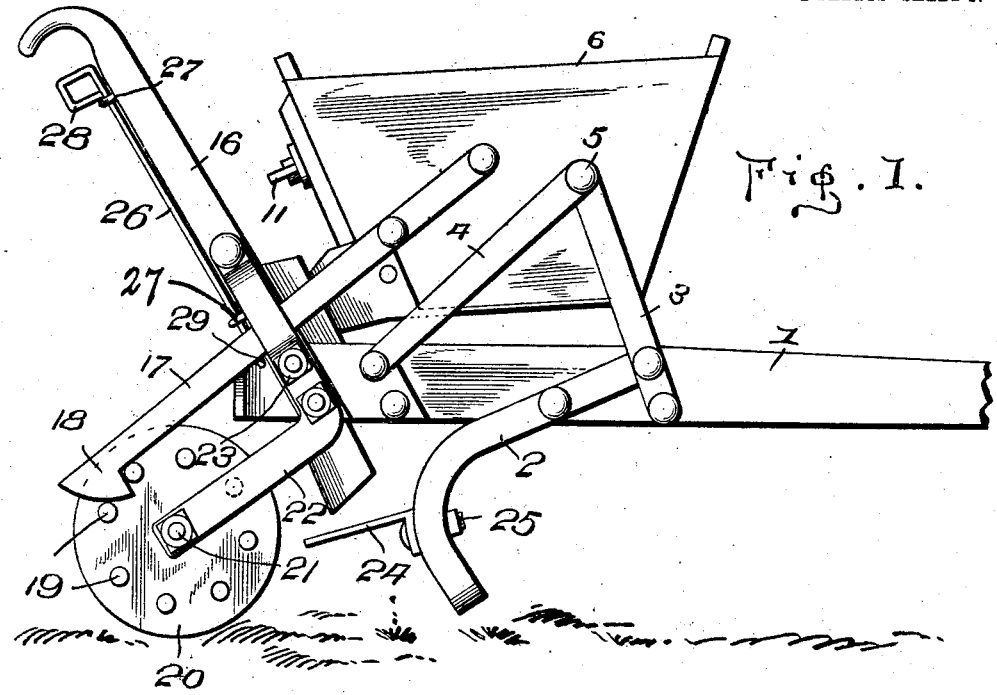
Figure 4:
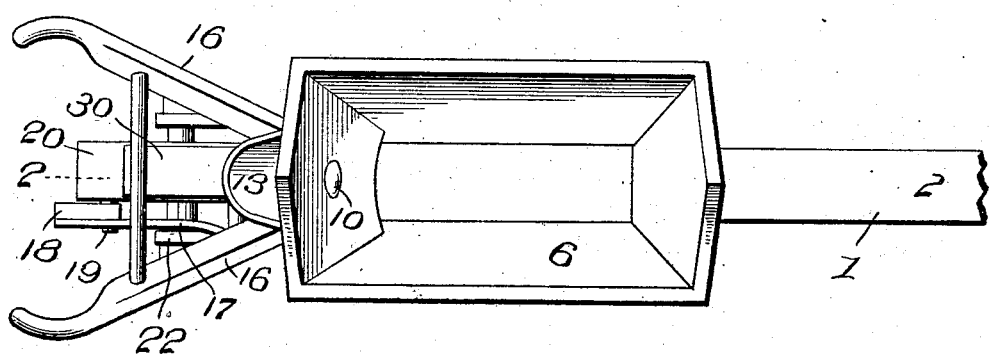

In the accompanying drawings, which are made a part of this application, Figure 1 is a side elevation of my improved fertilizer-distributer complete. Fig. 2 is a central longitudinal sectional view thereof as seen from line 2 2, Fig. 4. Fig. 3 is a rear elevation thereof, and Fig. 4 is a top plan view thereof.

Referring to the drawings, in which similar reference-numerals designate corresponding parts throughout the several views, 1 indicates a beam, to which is secured a curved shank or standard 2, which is adapted to carry the usual form of furrow-making shovel. (Not shown.) Rigidly secured to the beam 1 and extending upwardly therefrom are standards 3 and 4, said standards being brought together at their upper ends and secured by means of bolts or the like 5, the aforesaid standards being in pairs and disposed on each side of the beam. Pivotally mounted upon the bolts 5 and between the standards is a hopper 6, said hopper having an opening 7 in its rear end, through which is adapted to pass the contents of the hopper.

A slide 8 is adjustably secured to the end of the hopper containing the opening 7, by which means the quantity of fertilizer passing through the opening 7 may be regulated, the slide being provided with an elongated slot 9, through which takes a bolt 10, the bolt being passed through the end of the hopper and provided at one end with a wing-nut 11.

Disposed around the opening 7 is a spout 12, said spout being designed to convey the fertilizer into a chute 13, from whence it is conveyed into the furrow. The chute 13 is pivotally secured to a clip 14 at the rear end of the beam 1, the chute being held therein by means of bolts 15, the bolts being passed through the chute and clip and through suitable guide-handles 16, extending rearwardly from the beam.

An arm 17 is rigidly secured to one side of the hopper 6 and extends rearwardly and downwardly therefrom and is provided at its lower end with a tapered head 18, which is designed to extend into the path of a plurality of pins 19, disposed at intervals upon one face of a wheel 20, said wheel being in turn mounted upon a shaft 21, carried by bars 22, extending downwardly and rearwardly from the beam 1.

By this construction it will be seen that when the device is moved forward the tapered head 18 will successively engage the pins 19 upon the wheel 20, and thereby swing the hopper 6 upon its pivot-point and cause the contents of the hopper to be moved outwardly through the opening 7, the impact between the tapered head and each succeeding pin giving the hopper a jar, thereby causing the contents of the hopper to be more readily fed through the opening 7.

The chute 13 may be adjusted so as to deposit the fertilizer at any point between the wheel 20 and the shank 2 by loosening the nuts 23 on the bolts 15 and adjusting the chute as desired.

With certain kinds of grain and plants it is desirable to deposit the fertilizer to one side of the center of the furrow, so that the fertilizer will not come into direct contact with the grain or plants, and to this end I have provided a plate 24, which is substantially L-shaped, the body portion of which extends rearwardly from the shank 2 and below the lower end of the chute 13, so that when the fertilizer descends in the chute 13 the plate 24 will direct the same to each side of the furrow and away from the grain or plants deposited therein.

The plate 24 is adjustably secured to the shank by means of a bolt 25, the bolt also serving to secure the furrow-making shovel to the shank. When the device is being moved from place to place or when it is being moved backward in th furrow, the arm 17 is elevated until the head 18 is out of engagement with the pins 19 by means of a rod 26, said rod being secured to one of the handles in any preferred manner, as by staples 27. The upper end of the rod 26 is provided with a handhold 28, while the lower end thereof is provided with a lateral extension 29, which extends below and engages the arm 17, so that when the rod 26 is elevated the head 18 is disengaged or removed from the path of the pins 19, thereby disposing the bottom of the hopper 6 horizontally with the beam 1 and preventing the discharge of the contents of the hopper through the opening 7.

The periphery of the wheel 20 is kept clear of adhering soil by means of a scraper 30, one end of the scraper being secured to the clip 14, while the opposite end thereof is disposed in juxtaposition to the periphery of the wheel.

From the above construction it will be seen that I have provided a very cheap and durable device and one that will be positive in its operation. It will further be seen that the device may be easily controlled by the operator, and while I have stated that the same is used more particularly in distributing that class of fertilizer known as "guano" I desire it to be understood that any class of disintegrated fertilizer may be used with equal success.

What I claim is—

1. A device of the class described comprising a beam, a hopper having an opening at one end thereof pivotally mounted upon said beam and means to intermittently tilt and jar said hopper whereby the contents thereof will be directed through said opening and additional means to distribute the contents of the hopper at each side of a furrow.

2. A device of the class described comprising the combination with a supporting-beam a hopper on said beam, a chute, means to direct the contents of said hopper into said chute and a shank secured to said beam, of a plate adjustably secured to said shank and below said chute whereby the contents of the hopper will be distributed to each side of a furrow.

3. A device of the class described comprising a supporting-beam, a hopper pivotally mounted upon said beam, a chute adjustably secured to said beam adapted to convey the contents of said hopper into a furrow, a shank secured to said beam, a plate adjustably mounted upon said shank and extending below the mouth of said chute whereby the contents of the hopper will be distributed at each side of the furrow, and means to tilt said hopper whereby the contents thereof will be caused to flow into the chute.

4. A device of the class described comprising a supporting-beam, standards on said beam, a hopper pivotally secured between said standards, said hopper having an opening in one end thereof, a spout around said opening, a chute adjustably secured to said beam and in the path of said spout, means at the lower end of said spout to direct the contents of the hopper to each side of a furrow, an arm secured to said hopper, a tapered head at the lower end of said arm, a wheel carried by said beam, a plurality of pins on said wheel and in the path of said head whereby when the wheel is rotated the hopper will be tilted and the contents thereof caused to flow through the opening therein, and means to remove the head from the path of the pins.

In testimony whereof I have signed my name to this specification in the presence of two subscribing witnesses.

WILLIAM A. FREEMAN.

Witnesses:
VIRGIL A. FREEMAN,
W. D. FOUNTAIN.